(No Model.)

G. WESTINGHOUSE, Jr.
PIPE COUPLING FOR GAS MAINS.

No. 318,840. Patented May 26, 1885.

WITNESSES:

INVENTOR.
George Westinghouse, Jr.
BY George H. Christy
ATTORNEY.

UNITED STATES PATENT OFFICE.

GEORGE WESTINGHOUSE, JR., OF PITTSBURG, PENNSYLVANIA.

PIPE-COUPLING FOR GAS-MAINS.

SPECIFICATION forming part of Letters Patent No. 318,840, dated May 26, 1885.

Application filed April 21, 1885. (No model.)

*To all whom it may concern:*

Be it known that I, GEORGE WESTINGHOUSE, Jr., residing at Pittsburg, in the county of Allegheny and State of Pennsylvania, a citizen of the United States, have invented or discovered a certain new and useful Improvement in Pipe-Couplings for Gas-Mains, of which improvement the following is a specification.

Figure 1:
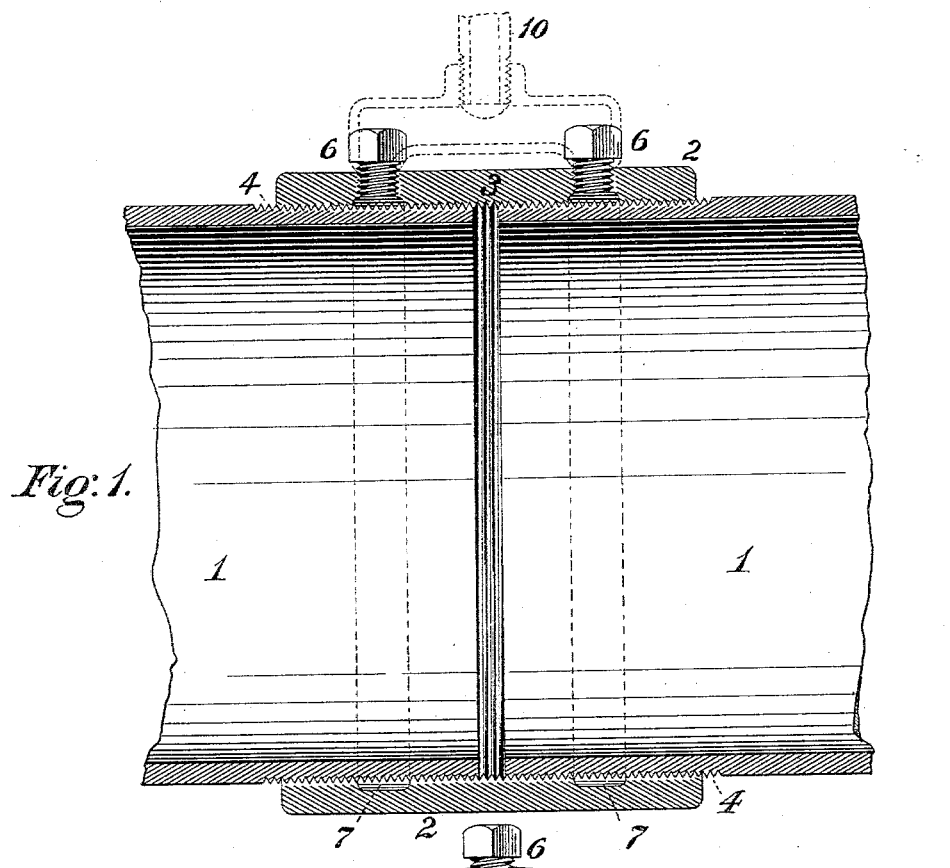
Figure 2:
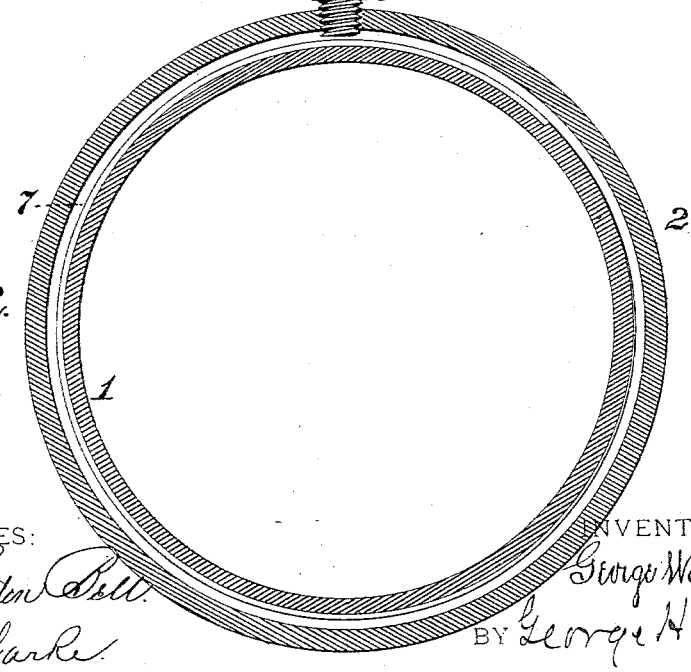

In the accompanying drawings, which make part of this specification, Figure 1 is a longitudinal central section through a pipe-coupling embodying my invention, and Fig. 2 a transverse section through the same at the line *x x* of Fig. 1.

The object of my invention is to provide a coupling for pipe-lines, in the use of which liability to leakage will be reduced and facilities for detecting and arresting escape of fluid, if any, which may occur thereat shall be afforded.

To this end my invention, generally stated, consists in an internally-threaded coupling-socket having annular recesses on its inner side, each forming a chamber or receptacle which is interposed between the end of the socket and the adjacent end of one of the pipe-sections connected thereto.

The improvement claimed is hereinafter more fully set forth.

In the practice of my invention the coupling-sockets 2, by which the sections 1 1 of a main or line of pipe are connected, are provided with internal threads, 3, which engage external threads, 4, on the pipe-sections in the ordinary manner. An annular groove or recess, 7, is formed in the bore of the socket 2, on each side of its transverse center line, each of said recesses forming a chamber or receptacle which is closed on its inner side by the adjacent pipe-section 1, when screwed into engagement with the socket, and is interposed between the outer end of the socket and the inner end of the pipe-section, thus serving to intercept and receive any leakage of fluid from the main which may pass between the threads of the section and socket. The portion of the socket-thread 3 lying between the inner sides of the recesses 7 is preferably made of slightly-reduced diameter relatively to the portions of said thread which extend from the outer sides of the recesses to the ends of the socket, so as to tighten the socket upon the pipe-sections and enable the closest practicable engagement of the sections and socket to be made between the inner sides of the recesses, to the end of preventing, as far as may be, leakage into the chambers, while the portions of the joints exterior to the chambers, being exposed to a materially lower pressure, are capable of resisting the same with a comparatively less close degree of fitting, and, if desired, the thread outside of the recesses may be omitted and any suitable packing interposed. The socket-chambers 7, which are thus provided in the completed pipe-joint, are each provided with an opening or vent, which may either be closed by a suitable tight plug, 6, by the removal of which the tightness of the joint may be tested by the application of fluid under pressure, or may be connected with a vent or escape-pipe, 10, leading to a suitable point of discharge, which can be either directly into the atmosphere or into a leakage-line or a low-pressure line. The chambers 7 may further be filled with semi-liquid material forced thereinto under pressure and confined therein by tight plugs; but such accessories of the chambers, being set forth in other applications for Letters Patent by me, are not herein claimed.

I am aware that coupling-sockets having end recesses adapted to receive calking material were known prior to my invention; and such, therefore, I do not broadly claim.

I claim herein as my invention—

1. An internally-threaded coupling-socket having an annular groove or recess in its bore below its screw-thread and on each side of its transverse center, said grooves forming chambers or receptacles which are closed at their outer ends by the metal of the socket, substantially as set forth.

2. An internally-threaded coupling-socket having an annular groove or recess in its bore on each side of its transverse center, and having that portion of its thread lying between its recesses of slightly-reduced diameter relatively to the portions between said recesses and the ends of the socket, substantially as set forth.

3. An internally-threaded coupling-socket having an annular groove or recess in its bore on each side of its transverse section, said recesses having openings or vents adapted to be closed by tight plugs or connected to communicating pipes, substantially as set forth.

4. The combination of an internally-threaded coupling-socket having two annular grooves or recesses in its bore, each having its outer end wall formed by the metal of the socket, and two externally-threaded pipe-sections, each fitting the socket on both sides of a recess thereof, substantially as set forth.

In testimony whereof I have hereunto set my hand.

GEO. WESTINGHOUSE, JR.

Witnesses:
J. SNOWDEN BELL,
R. H. WHITTLESEY.